(12) United States Patent
Sawaguchi

(10) Patent No.: US 11,135,767 B2
(45) Date of Patent: Oct. 5, 2021

(54) MATERIAL FOR THREE-DIMENSIONAL MODELING, METHOD FOR MANUFACTURING MATERIAL FOR THREE-DIMENSIONAL MODELING, AND RESIN MOLDED BODY

(71) Applicant: ZEON CORPORATION, Tokyo (JP)

(72) Inventor: Taichi Sawaguchi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 475 days.

(21) Appl. No.: 16/064,616

(22) PCT Filed: Dec. 26, 2016

(86) PCT No.: PCT/JP2016/088761
§ 371 (c)(1),
(2) Date: Jun. 21, 2018

(87) PCT Pub. No.: WO2017/119346
PCT Pub. Date: Jul. 13, 2017

(65) Prior Publication Data
US 2018/0370126 A1    Dec. 27, 2018

(30) Foreign Application Priority Data

Jan. 4, 2016    (JP) .............................. JP2016-000188

(51) Int. Cl.
| | | |
|---|---|---|
| *B29C 64/147* | (2017.01) | |
| *C08L 65/00* | (2006.01) | |
| *B33Y 70/00* | (2020.01) | |
| *B29C 64/118* | (2017.01) | |
| *B29B 13/02* | (2006.01) | |
| *B29C 64/314* | (2017.01) | |
| *B29C 64/209* | (2017.01) | |
| *B29B 13/06* | (2006.01) | |
| *C08L 55/02* | (2006.01) | |
| *B29B 9/06* | (2006.01) | |
| *B29K 55/02* | (2006.01) | |
| *B29K 105/04* | (2006.01) | |

(52) U.S. Cl.
CPC ............ *B29C 64/147* (2017.08); *B29B 13/02* (2013.01); *B29B 13/06* (2013.01); *B29C 64/118* (2017.08); *B29C 64/209* (2017.08); *B29C 64/314* (2017.08); *B33Y 70/00* (2014.12); *C08L 55/02* (2013.01); *C08L 65/00* (2013.01); *B29B 9/06* (2013.01); *B29K 2055/02* (2013.01); *B29K 2105/04* (2013.01); *C08G 2261/3324* (2013.01); *C08G 2261/724* (2013.01)

(58) Field of Classification Search
CPC ... B29C 64/147; B29C 64/314; B29C 64/209; C08L 55/02; C08L 65/00; B29B 13/06
USPC .......................................................... 520/1
See application file for complete search history.

(56) References Cited

U.S. PATENT DOCUMENTS

2016/0177078 A1    6/2016   Naito et al.

FOREIGN PATENT DOCUMENTS

| JP | 2006124580 A | | 5/2006 |
|---|---|---|---|
| JP | 2010090350 A | | 4/2010 |
| JP | 2010095706 A | * | 4/2010 |
| JP | 2010095706 A | | 4/2010 |
| JP | 2016060147 A | | 4/2016 |
| WO | 2010032570 A1 | | 3/2010 |
| WO | 2015037574 A1 | | 3/2015 |

OTHER PUBLICATIONS

Mar. 28, 2017, International Search Report issued in the International Patent Application No. PCT/JP2016/088761.

* cited by examiner

*Primary Examiner* — Hui H Chin
(74) *Attorney, Agent, or Firm* — Kenja IP Law PC

(57) ABSTRACT

The present invention is a three-dimensional modeling material containing an alicyclic structure-containing polymer and having a void fraction of 10 vol % or lower, a method for producing the three-dimensional modeling material, and a resin formed article obtained by a thermal melting lamination method using the three-dimensional modeling material. Though the present invention, there are provided a three-dimensional modeling material capable of obtaining a resin formed article having little warp and excellent in impact resistance and appearance, a production method therefor, and a resin formed article formed by using the three-dimensional modeling material.

4 Claims, 1 Drawing Sheet

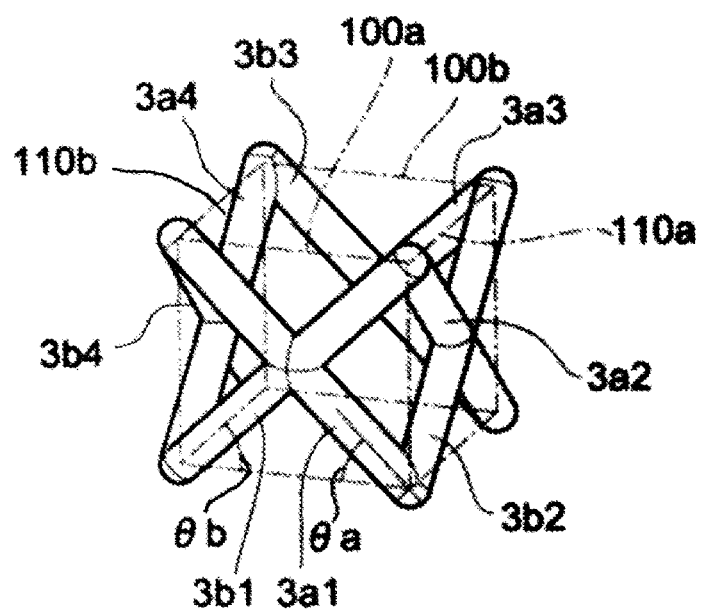

MATERIAL FOR THREE-DIMENSIONAL MODELING, METHOD FOR MANUFACTURING MATERIAL FOR THREE-DIMENSIONAL MODELING, AND RESIN MOLDED BODY

TECHNICAL FIELD

The present invention relates to a three-dimensional modeling material capable of obtaining a resin formed article having little warp and excellent in impact resistance and appearance, a production method therefor, and a resin formed article formed by using the three-dimensional modeling material.

BACKGROUND ART

In recent years, three-dimensional modeling technologies (3D-printing technologies) have attracted attention as methods for producing resin formed articles. Above all, cost reduction of three-dimensional modeling devices (3D-printer) using a thermal melting lamination method has been promoted, and the devices have become prevalent among general consumers.

In the thermal melting lamination method, a thermoplastic resin is thermally molten, and a partial structure of each layer is formed on the basis of CAD data while extruding the resin from a nozzle. Then this process can be repeated to form a multilayer, so that a resin formed article having a predetermined structure can be produced.

When producing a resin formed article by a thermal melting lamination method, a filament made of a PLA resin (polylactic acid resin) or an ABS resin (acrylonitrile/butadiene/styrene copolymer) is typically used as a material.

For example, Patent Document 1 describes a three-dimensional modeling material obtained by blending a polylactic acid resin, a styrene-based resin and the like.

Also, this document describes that a resin formed article having little warp and an easily polishable surface can be obtained by using the three-dimensional modeling material.

CITATION LIST

Patent Literature

PTL 1: WO 2015/37574, brochure (US2016/0177078 A1)

SUMMARY OF INVENTION

Technical Problem

As described in Patent Document 1, a resin formed article having little warp and facilitating surface polish can be produced by using a three-dimensional modeling material containing a polylactic acid resin, other resin components and the like.

However, as a result of investigation by the inventor, it has been found that, even when using such a material, a warp is caused if the obtained resin formed article is placed under a high-temperature and high-humidity condition for a long term.

In addition, it has been found that, when an ABS resin and an alicyclic structure-containing polymer are tested as resin components, use of these resins also causes problems of warp and rough surface of the resin formed article.

The present invention has been made in view of the above circumstances, and the object of the present invention is to provide a three-dimensional modeling material capable of obtaining a resin formed article having little warp and excellent in impact resistance and appearance, a production method therefor, and a resin formed article formed by using the three-dimensional modeling material.

Solution to Problem

To solve the above problem, the inventor conducted extensive studies with regard to the three-dimensional modeling material. As a result, the inventor has found that a resin formed article having little warp and excellent in impact resistance and appearance can be obtained by using a three-dimensional modeling material containing an alicyclic structure-containing polymer as a resin component and having a lowered void fraction. This finding has led to the completion of the invention.

Several aspects of the invention provide a three-dimensional modeling material of [1], a method for producing the three-dimensional modeling material of [2], and a resin formed article of [3], described below.

[1] A three-dimensional modeling material containing an alicyclic structure-containing polymer and having a void fraction of 10 vol % or lower.

[2] A method for producing the three-dimensional modeling material according to [1], including a step of drying a production raw material containing the alicyclic structure-containing polymer at a temperature of (a glass transition temperature of the alicyclic structure-containing polymer—30° C.) to (a glass transition temperature of the alicyclic structure-containing polymer—1° C.).

[3] A resin formed article obtained by a thermal melting lamination method using the three-dimensional modeling material according to [1].

Advantageous Effects of Invention

Several aspects of the invention provide a three-dimensional modeling material capable of obtaining a resin formed article having little warp and excellent in impact resistance and appearance, a production method therefor, and a resin formed article formed by using the three-dimensional modeling material.

BRIEF DESCRIPTION OF DRAWINGS

FIG. 1 is a drawing illustrating a resin formed article produced in Examples.

DESCRIPTION OF EMBODIMENTS

The three-dimensional modeling material according to one embodiment of the invention is characterized in that it contains an alicyclic structure-containing polymer and has a void fraction of 10 vol % or lower.

[Alicyclic Structure-Containing Polymer]

The alicyclic structure-containing polymer contained in the three-dimensional modeling material according to one embodiment of the invention has alicyclic structures in its main chain and/or side chain. Above all, the polymer having alicyclic structures in its main chain is preferred because a resin formed article excellent in mechanical strength, heat resistance and the like can be easily obtained.

Examples of the alicyclic structures include a saturated cyclic hydrocarbon (cycloalkane) structure, an unsaturated cyclic hydrocarbon (cycloalkene) structure, and the like. Above all, the cycloalkane structure is preferred because a resin formed article excellent in mechanical strength, heat resistance and the like can be easily obtained.

The number of carbon atoms constituting the alicyclic structure is not particularly limited, but is normally 4 to 30, preferably 5 to 20, and more preferably 5 to 15. When the number of carbon atoms constituting the alicyclic structure is within the above range, a resin formed article having more-highly balanced properties such as mechanical strength and heat resistance can easily obtained.

A ratio of a repeating unit having the alicyclic structure in the alicyclic structure-containing polymer can be appropriately selected depending on the intended purpose. The ratio of this repeating unit is normally 30 wt % or higher, preferably 50 wt % or higher, and more preferably 70 wt % or higher based on the whole repeating units. When the ratio of the repeating unit having the alicyclic structure in the alicyclic structure-containing polymer is 30 wt % or higher, a resin formed article excellent in heat resistance, transparency and the like can be easily obtained. The remainder other than the repeating unit having the alicyclic structure in the alicyclic structure-containing polymer is not particularly limited, and is appropriately selected depending on the intended purpose.

A weight average molecular weight (Mw) of the alicyclic structure-containing polymer is not particularly limited, but is normally 5,000 to 500,000, preferably 8,000 to 200,000, and more preferably 10,000 to 100,000. When the weight average molecular weight (Mw) of the alicyclic structure-containing polymer is within the above range, the mechanical strength of the resin formed article and workability in production of the resin formed article are more-highly balanced.

A molecular weight distribution (Mw/Mn) of the alicyclic structure-containing polymer is not particularly limited, but is normally 1.0 to 4.0, preferably 1.0 to 3.0, and more preferably 1.0 to 2.5.

The weight average molecular weight (Mw) and the number average molecular weight (Mn) of the alicyclic structure-containing polymer can be determined in accordance with the method described in Examples.

A glass transition temperature (Tg) of the alicyclic structure-containing polymer is not particularly limited, but is normally 100 to 200° C., and preferably 100 to 170° C.

When the glass transition temperature (Tg) of the alicyclic structure-containing polymer is 100° C. or higher, a resin formed article excellent in heat resistance can be easily obtained. In addition, a resin composition containing an alicyclic structure-containing polymer in which the glass transition temperature (Tg) of the alicyclic structure-containing polymer is 200° C. or lower has a sufficient flowability during melting and is excellent in formability.

The glass transition temperature (Tg) can be measured based on JIS K 6911.

Specific examples of the alicyclic structure-containing polymer include (1) norbornene-based polymer, (2) monocyclic cycloolefin-based polymer, (3) cyclic conjugated diene-based polymer, (4) vinyl alicyclic hydrocarbon-based polymer, and the like. Above all, the norbornene-based polymer is preferred because a resin formed article excellent in heat resistance and mechanical strength can be easily obtained.

Note that these polymers refer to not only polymerization reaction products but also hydrogenated products thereof in this specification.

(1) Norbornene-Based Polymer

The norbornene-based polymer is a polymer that can be obtained by polymerizing a norbornene-based monomer as a monomer having a norbornene skeleton, or a hydrogenated product thereof.

Examples of the norbornene-based polymer include a ring-opening polymer of a norbornene-based monomer, a ring-opening polymer of a norbornene-based monomer and another monomer capable of ring-opening copolymerization therewith, hydrogenated products of these ring-opening polymers, an addition polymer of a norbornene-based polymer, an addition polymer of a norbornene-based monomer and another monomer copolymerizable therewith, and the like.

Examples of the norbornene-based monomer include bicyclo[2.2.1]hept-2-ene (trivial name: norbornene) and a derivative thereof (having a substituents on the ring), tricyclo[4.3.0$^{1,6}$.1$^{2,5}$]deca-3,7-diene (trivial name: dicyclopentadiene) and a derivative thereof, tetracyclo[9.2.1.0$^{2,10}$.0$^{3,8}$]tetradeca-3,5,7,12-tetraene (also referred to as methanotetrahydrofluorene, 7,8-benzotricyclo[4.3.0.1$^{2,5}$]dec-3-ene, and 1,4-methano-1,4,4a,9a-tetrahydrofluorene) and a derivative thereof, tetracyclo[4.4.1$^{2,5}$.1$^{7,10}$.0]dodec-3-ene (trivial name: tetracyclododecene) and a derivative thereof, and the like.

Examples of the substituents include an alkyl group, an alkylene group, a vinyl group, an alkoxycarbonyl group, an alkylidene group and the like.

Examples of the norbornene-based monomer having a substituent include 8-methoxycarbonyl-tetracyclo[4.4.0.1$^{2,5}$.1$^{7,10}$]dodec-3-ene, 8-methyl-8-methoxycarbonyl-tetracyclo[4.4.0.1$^{2,5}$.1$^{7,10}$]dodec-3-ene, 8-ethylidene-tetracyclo[4.4.0.1$^{2,5}$.1$^{7,10}$]dodec-3-ene, and the like.

These norbornene-based monomers may be used either alone or in combination of two or more kinds.

Examples of other monomers capable of ring-opening copolymerization with the norbornene-based monomer include monocyclic cycloolefin-based monomers such as cyclohexene, cycloheptene, cyclooctene and derivatives thereof, and the like. Examples of these substituents include substituents similar to those shown as the substituents of the norbornene-based monomers.

Examples of other monomers capable of addition copolymerization with the norbornene-based monomer include an α-olefin having 2 to 20 carbon atoms such as ethylene, propylene, 1-butene, 1-pentene and 1-hexene, and a derivative thereof; a cycloolefin such as cyclobutene, cyclopentene, cyclohexene and cyclooctene, and a derivative thereof; a nonconjugated diene such as 1,4-hexadiene, 4-methyl-1,4-hexadiene, 5-methyl-1,4-hexadiene and 1,7-octadiene; and the like. Above all, the α-olefin is preferred, and ethylene is particularly preferred. Examples of these substituents include substituents similar to those shown as the substituents of the norbornene-based monomer.

A ring-opening polymer of the norbornene-based monomer, or a ring-opening polymer of the norbornene-based monomer and another monomer capable of ring-opening copolymerization therewith can be obtained by polymerizing the monomer components in the presence of a known ring-opening polymerization catalyst. Examples of the ring-opening polymerization catalyst include a catalyst composed of a halide of a metal such as ruthenium and osmium, a nitrate or an acetylacetone compound, and a reducing agent; or alternatively a catalyst composed of a halide of a metal such as titanium, zirconium, tungsten and molybdenum or an acetylacetone compound, and an organoaluminum compound; and the like.

A hydrogenated ring-opening polymer of a norbornene-based monomer can be normally obtained by adding a known hydrogenation catalyst containing a transition metal such as nickel and palladium to a polymerization solution of the above-described ring-opening polymer to hydrogenate a carbon-carbon unsaturated bond.

An addition polymer of a norbornene-based monomer, or an addition polymer of a norbornene-based monomer and another monomer copolymerizable therewith can be synthesized by polymerizing monomer components in the presence of a known addition polymerization catalyst. Examples of the addition polymerization catalyst include a catalyst composed of a titanium, zirconium or vanadium compound and an organoaluminum compound.

Among these norbornene-based polymers, the hydrogenated ring-opening polymer of the norbornene-based monomer is preferred because a resin formed article excellent in heat resistance, mechanical strength and the like can be easily obtained.

(2) Monocyclic Cycloolefin-Based Polymer

Examples of the monocyclic cycloolefin-based polymer include an addition polymer of a monocyclic cycloolefin-based monomer such as cyclohexene, cycloheptene and cyclooctene.

The method for synthesizing these addition polymers is not particularly limited, and a known method can be appropriately used.

(3) Cyclic Conjugated Diene-Based Polymer

Examples of the cyclic conjugated diene-based polymer include a polymer obtained by 1,2- or 1,4-addition polymerization of a cyclic conjugated diene-based monomer such as cyclopentadiene and cyclohexadiene, a hydrogenated product thereof, and the like.

The method for synthesizing these addition polymers is not particularly limited, and a known method can be appropriately used.

(4) Vinyl Alicyclic Hydrocarbon-Based Polymer

Examples of the vinyl alicyclic hydrocarbon-based polymer include a polymer of a vinyl alicyclic hydrocarbon-based monomer such as vinylcyclohexene and vinylcyclohexane, and a hydrogenated product thereof; a hydrogenated product at the aromatic ring portion of a polymer of a vinyl aromatic monomer such as styrene and α-methylstyrene; and the like. Also, it may be a copolymer of a vinyl alicyclic hydrocarbon-based monomer or a vinyl aromatic monomer and another monomer copolymerizable with these monomers. Examples of such a copolymer include a random copolymer, a block copolymer and the like.

The method for synthesizing these polymers is not particularly limited, and a known method can be appropriately used.

The three-dimensional modeling material according to one embodiment of the invention may contain components other than the alicyclic structure-containing polymer.

Examples of the components other than the alicyclic structure-containing polymer include polymers other than the alicyclic structure-containing polymer, and additives such as antioxidant, UV absorber, light stabilizer, near infrared absorber, plasticizer, antistatic agent and acid scavenger.

Examples of the polymer other than the alicyclic structure-containing polymer include a soft polymer and a terpene phenol resin.

The soft polymer refers to polymers that normally have a Tg of 30° C. or lower described in JP-A-2006-124580 or the like, and when there are a plurality of Tgs, they refer to polymers in which at least the lowest Tg is 30° C. or lower.

Among such soft polymers, a polymer in which a melt mass flow rate (MFR) at 230° C. and 21.18 N is 10 g/10 min to 100 g/10 min as measured in accordance with JIS K 7210 is preferred.

Examples of the soft polymer include an olefin-based soft polymer such as liquid polyethylene, polypropylene, poly-1-butene, ethylene/α-olefin copolymer, propylene/α-olefin copolymer, ethylene/propylene/diene copolymer (EPDM) and ethylene/propylene/styrene copolymer; an isobutylene-based soft polymer such as polyisobutylene, isobutylene/isoprene rubber and isobutylene/styrene copolymer; a diene-based soft polymer such as polybutadiene, polyisoprene, butadiene/styrene random copolymer, isoprene/styrene random copolymer, acrylonitrile/butadiene copolymer, acrylonitrile/butadiene/styrene copolymer, butadiene/styrene block copolymer, styrene/butadiene/styrene block copolymer, isoprene/styrene copolymer and styrene/isoprene/styrene block copolymer; a silicon-containing soft polymer such as dimethylpolysiloxane, diphenylpolysiloxane and dihydroxypolysiloxane; a soft polymer composed of an α,β-unsaturated acid, such as polybutyl acrylate, polybutyl methacrylate, polyhydroxyethyl methacrylate, polyacrylamide, polyacrylonitrile and butyl acrylate/styrene copolymer; a soft polymer composed of an unsaturated alcohol and an amine or an acyl derivative thereof or an acetal, such as polyvinyl alcohol, polyvinyl acetate, polyvinyl stearate and vinyl acetate/styrene copolymer; an epoxy-based soft polymer such as polyethylene oxide, polypropylene oxide and epichlorohydrin rubber; a fluorine-based soft polymer such as vinylidene fluoride-based rubber and tetrafluoroethylene/propylene rubber; and a soft polymer such as natural rubber, polypeptide, protein, polyester-based thermoplastic elastomer, vinyl chloride-based thermoplastic elastomer and polyamide-based thermoplastic elastomer. These soft polymers may have a crosslinked structure, and also may be a polymer into which a functional group is introduced by a modification reaction.

Each of these soft polymers may be used either alone or in combination of two or more kinds.

When the three-dimensional modeling material according to one embodiment of the invention contains a soft polymer, the content thereof is normally 0.01 to 50 wt %, and preferably 0.1 to 30 wt % based on the alicyclic structure-containing polymer. If the content of the soft polymer is too large, transparency of the obtained resin composition may be decreased.

The terpene phenol resin is a polymerization product of a terpene compound and a phenol. The terpene phenol resin can be produced e.g. by cationically polymerizing 1 mol of a terpene compound and 0.1 to 15 mol of a phenol in the presence of Friedel Crafts catalyst at −10 to +120° C. for 0.5 to 20 hours.

Examples of the terpene compounds include myrcene, alloocimene, ocimene, α-pinene, β-pinene, dipentene, limonene, α-phellandrene, α-terpinene, γ-terpinene, terpinolene, 1,8-cineol, 1,4-cineol, α-terpineol, β-terpineol, γ-terpineol, camphene, tricyclene, sabinene, paramenthadienes, carenes and the like.

Examples of the phenols include phenol, cresol, xylenol, catechol, resorcin, hydroquinone, bisphenol A and the like.

Examples of the Friedel Crafts catalyst include zinc chloride, titanium tetrachloride, tin chloride, aluminum chloride, boron trifluoride, iron chloride, antimony trichloride and the like.

In addition, a hydrogenated terpene resin oligomer or the like obtained by hydrogenating a terpene phenol resin can also be used as a terpene phenol resin.

A commercial terpene phenol resin may be used. Examples of the commercial product include Polyster series and Mighty Ace series manufactured by Yasuhara Chemical Co., Ltd.

When the three-dimensional modeling material according to one embodiment of the invention contains a terpene phenol resin, the content thereof is normally 0.1 to 30 wt %, and preferably 1 to 20 wt % based on the alicyclic structure-containing polymer. If the content of the terpene phenol resin is too large, the thermal stability of the obtained resin formed article may be decreased.

Examples of the antioxidant include a phenol-based antioxidant, a phosphorus-based antioxidant, a sulfur-based antioxidant, and the like.

Examples of the phenol-based antioxidant include
3,5-di-t-butyl-4-hydroxytoluene, dibutylhydroxytoluene,
2,2'-methylenebis(6-t-butyl-4-m ethylphenol),
4,4'-butylidenebis(3-t-butyl-3-methylphenol), 4,4'-thiobis (6-t-butyl-3-methylphenol),
α-tocopherol, 2,2,4-trimethyl-6-hydroxy-7-t-butylchroman,
tetrakis[methylene-3-(3',5'-di-t-butyl-4'-hydroxyphenyl) propionate] methane,
pentaerythritol tetrakis[3-(3,5-di-t-butyl-4-hydroxyphenyl) propionate], and the like.

Examples of the phosphorus-based antioxidant include distearyl pentaerythritol diphosphite, bis(2,4-ditert-butylphenyl) pentaerythritol diphosphite, tris(2,4-ditert-butylphenyl) phosphite, tetrakis(2,4-ditert-butylphenyl)-4,4'-biphenyl diphosphite, trinonylphenyl phosphite, and the like.

Examples of the sulfur-based antioxidant include distearyl thiodipropionate, dilauryl thiodipropionate and the like.

Examples of the UV absorber include a benzotriazole-based UV absorber, a benzoate-based UV absorber, a benzophenone-based UV absorber, an acrylate-based UV absorber, a metal complex-based UV absorber, and the like.

Examples of the light stabilizer include a hindered amine-based light stabilizer.

Examples of the near infrared absorber include a cyanine-based near infrared absorber; a pyrylium-based infrared absorber; a squarylium-based near infrared absorber; a croconium-based infrared absorber; an azulenium-based near infrared absorber; a phthalocyanine-based near infrared absorber; a dithiol metal complex-based near infrared absorber; a naphthoquinone-based near infrared absorber; an anthraquinone-based near infrared absorber; an indophenol-based near infrared absorber; an azide-based near infrared absorber; and the like.

Examples of the plasticizer include a phosphate triester-based plasticizer, an aliphatic monobasic acid ester-based plasticizer, a dihydric alcohol ester-based plasticizer, an oxyacid ester-based plasticizer, and the like.

Examples of the antistatic agent include a fatty acid ester of a polyhydric alcohol, and the like.

Examples of the acid scavenger include magnesium oxide, zinc stearate, and the like.

The contents of these components can be appropriately determined according to the intended purpose. Their contents are normally 0.001 to 5 wt %, and preferably 0.01 to 1 wt % based on the alicyclic structure-containing polymer.

The void fraction of the three-dimensional modeling material according to one embodiment of the invention is 10 vol % or lower, preferably 0 to 5 vol %, and more preferably 0 to 2 vol %.

When a resin formed article is produced using a three-dimensional modeling material containing an alicyclic structure-containing polymer, the surface of the resin formed article tends to get rough. In the present invention, when the void fraction of the three-dimensional modeling material containing the alicyclic structure-containing polymer is decreased, a resin formed article having suppressed roughness on the surface and excellent in appearance can be produced.

The void fraction of the three-dimensional modeling material can be determined in accordance with the method described in Examples.

A three-dimensional modeling material having a low void fraction can be obtained by drying a production raw material for the three-dimensional modeling material, as described later.

The three-dimensional modeling material according to one embodiment of the invention can be obtained by a process in which a production raw material is prepared by mixing respective components as necessary, then this production raw material is dried, and subsequently this production raw material is melt-formed into a predetermined shape.

Examples of the mixing method for obtaining the production raw material include a method of mixing respective components in an appropriate solvent and a method of kneading them in a molten state.

Kneading can be carried out by using a melt-kneader such as a single-screw extruder, a twin-screw extruder, a Banbury mixer, a kneader, a feeder ruder and a high shearing device. The kneading temperature is preferably 180 to 400° C., and more preferably 200 to 350° C. For kneading, respective components may be collectively added and kneaded, or may be kneaded while adding them in several batches.

The form of the production raw material is not particularly limited, but a material pelletized in accordance with a conventional method is preferably used.

The condition for drying the production raw material is not particularly limited, but the temperature for drying is normally (Tgc—30° C.) to (Tgc—1° C.), and preferably (Tgc—25° C.) to (Tgc—5° C.) when the glass transition temperature of the alicyclic structure-containing polymer is represented by Tgc (° C.). The drying time is normally 4 to 24 hours, and preferably 4 to 12 hours. The material may be dried under normal pressure (pressure equal to atmospheric pressure) or under reduced pressure, but preferably at 1 to 100 kPa, and more preferably 1 to 50 kPa.

When melt-forming the dried production raw material, a known method can be used.

For example, a dried production raw material is put into an extruder, melt-kneaded, then the molten resin is continuously discharged from a spinning nozzle connected to the extruder, which is cooled to obtain a filamentary three-dimensional modeling material.

The diameter of the filamentary three-dimensional modeling material is not particularly limited, but is normally 1.0 to 2.5 mm.

In addition, the dried production raw material can be put into an extruder, melt-kneaded, then extruded into a bar shape from the extruder, cooled, and then cut into an appropriate length by a strand cutter to obtain a pelletized three-dimensional modeling material.

The three-dimensional modeling material according to one embodiment of the invention is used in the case of producing a resin formed article by a thermal melting lamination method.

The thermal melting lamination method is a kind of three-dimensional modeling techniques, wherein a partial structure of each layer is formed on the basis of CAD data while extruding the thermally molten three-dimensional modeling material from a nozzle, and this process is repeated to form a multilayer, so that a resin formed article having a predetermined structure can be produced.

When producing a resin formed article using the three-dimensional modeling material of the present invention, a commercial thermal melting lamination type 3D printer is available.

Since the three-dimensional modeling material according to one embodiment of the invention contains an alicyclic structure-containing polymer, the resin formed article obtained by the thermal melting lamination method using the three-dimensional modeling material according to one embodiment of the invention has little warp and is excellent in impact resistance.

Furthermore, since the three-dimensional modeling material according to one embodiment of the invention contains the alicyclic structure-containing polymer and has a void fraction of 10 vol % or lower, the resin formed article obtained by the thermal melting lamination method using the three-dimensional modeling material according to one embodiment of the invention has suppressed roughness on the surface and is excellent in appearance.

EXAMPLES

The invention is further described below by way of Examples and Comparative Examples in detail. Note that the invention is not limited to the following examples. Hereinafter, the units "parts" and "%" used respectively refer to "parts by weight" and "wt %" unless otherwise indicated.

Methods for measuring various properties are as described below.

(1) Weight Average Molecular Weight (Mw) and Number Average Molecular Weight (Mn)

The weight average molecular weight (Mw) and the number average molecular weight (Mn) were determined as standard polyisoprene-equivalent values by conducting gel permeation chromatography (GPC) using cyclohexane as an eluent at 40° C.

As a measuring device, HLC-8120GPC (manufactured by Tosoh Corporation) was used.

As the standard polyisoprene, standard polyisoprenes (10 types in total, Mw=602, 1390, 3920, 8050, 13800, 22700, 58800, 71300, 109000, 280000, all of which are manufactured by Tosoh Corporation) were used.

The sample was prepared by thermally dissolving a measurement sample in cyclohexane at 40° C. so that the sample concentration was 4 mg/ml.

The measurement was carried out using three columns TSKgel G5000HXL, TSKgel G4000HXL and TSKgel G2000HXL (all of them are manufactured by Tosoh Corporation) connected in series under a condition of a flow rate of 1.0 ml/min, a sample injection volume of 100 μml and a column temperature of 40° C.

(2) Hydrogenation Ratio

The hydrogenation ratio in the hydrogenation reaction was calculated based on the results of measuring $^1$H-NMR in deuterated chloroform solvent.

(3) Glass Transition Temperature (Tg)

The glass transition temperature (Tg) of the resin composition was measured using a differential scanning calorimeter (DSC6220SII, manufactured by SII NanoTechnology Inc.) in accordance with JIS K 6911.

(4) Void Fraction

The density of the three-dimensional modeling material (filament) was measured using a specific gravity measuring device (Type A, manufactured by Shibayama Scientific Co., Ltd.). Subsequently, the void fraction was calculated in accordance with the following equation by using the resulting measured density.

Void fraction (vol %)=100×{[(theoretical density)−(measured density)]/(theoretical density)}

(5) Surface Roughness of Resin Formed Article

The surface roughness (Ra) (μm) in a 200 μm×200 μm range on the surface of the resin formed article was measured using a color 3D laser microscope (manufactured by KEYENCE CORPORATION).

(6) Warp of Resin Formed Article

A 3a1 and 3b1 face side of the resin formed article was placed on a flat stage, and a quantity of warp of the resin formed article (the maximum value of the void between the 3a1 and 3b1 face of the resin formed article and the flat stage) was measured using a clearance gauge.

(7) Warp of Resin Formed Article after Environmental Test

The resin formed article was put into a thermohygrostat bath set to a temperature of 60° C. and a relative humidity of 90%, and after one week, taken out, and the quantity of warp was measured in accordance with the method described in (6).

(8) Impact Resistance

The resin formed article was dropped from a height of 1.5 m onto a concrete floor. This step was repeated ten times, then presence or absence of breakage and deformation was checked by visual observation to evaluate the impact resistance in accordance with the following criteria.

Good: After 10 drop tests, the resin formed article was not broken or deformed.

Medium: After 10 drop tests, the resin formed article was not broken, but it was deformed.

Bad: The resin formed article was broken within 10 times.

Production Example 1

250 parts of dehydrated cyclohexane was put into a reactor whose inside was under a nitrogen atmosphere at room temperature (25° C.), to which 0.82 part of 1-hexene, 0.15 part of dibutyl ether and 0.30 part of triisobutylaluminum were further added, and mixed. Subsequently, while maintaining the inside of the reactor at 45° C., 85 parts of tricyclo[4.3.0.1$^{2,5}$]dec-3-ene (DCP), 15 parts of 8-ethyltetracyclo[4.4.0.1$^{2,5}$.1$^{7,10}$]dodec-3-ene (ETD) and 40 parts of a toluene solution containing 0.7% tungsten hexachloride were sequentially added for 2 hours to carry out a polymerization reaction. Subsequently, the polymerization catalyst was inactivated by adding 1.06 part of butylglycidyl ether and 0.52 part of isopropyl alcohol to the polymerization reaction solution to terminate the polymerization reaction. The polymerization conversion ratio was 100%/o.

The resulting polymerization solution was transferred to a pressure-resistant hydrogenation reactor, to which 5 parts of a diatomaceous earth-supported nickel catalyst (G-96D, manufactured by Nissan Girdler Catalyst Co., Ltd., nickel supporting ratio: 58%) and 100 parts of cyclohexane were added, and reacted at 150° C. and a hydrogen pressure of 4.4 MPa for 8 hours. The resulting reaction solution was pressure-filtered by a pressure filter (FUNDA filter, manufactured by IHI Corporation) using Radiolite #500 (manufactured by Showa Chemical Industry Co., Ltd.) as a filter bed at a pressure of 0.25 MPa to remove the hydrogenation catalyst, resulting in a solution containing a colorless and transparent hydrogenated norbornene-based ring-opening polymer.

The resulting hydrogenated norbornene-based ring-opening polymer had a weight average molecular weight (Mw) of 41,000, a molecular weight distribution (Mw/Mn) of 3.4, a hydrogenation ratio of 99.4%, and a ramification index of 1.00.

Subsequently, to the solution containing the hydrogenated norbornene-based ring opening polymer obtained above, 0.50 part of antioxidant: pentaerythritol tetrakis[3-(3,5-di-t-butyl-4-hydroxyphenyl)propionate] (Irganox 1010, manufactured by BASF SE) was added based on 99.50 parts of the hydrogenated norbornene-based ring opening polymer, and dissolved. The resulting solution was sequentially filtered through a filter (zeta plus filter 30H, manufactured by CUNO Filter Systems, pore diameter: 0.5 to 1 μm), and furthermore filtered through another metallic fiber filter (manufactured by NICHIDAI CORPORATION, pore diameter: 0.4 μm) to remove fine solid contents.

Subsequently, cyclohexane as a solvent and other volatile components were removed from the resulting filtrate using a cylindrical concentration dryer (manufactured by Hitachi, Ltd.) under a condition of a temperature of 270° C. and a pressure of 1 kPa or lower, and the residues remained and molten. This melt was extruded into a strand shape from a die directly connected to the concentration dryer, cooled and then pelletized to obtain a resin composition (A) containing a hydrogenated norbornene-based ring-opening polymer.

This resin composition (A) had a glass transition temperature of 105° C.

Example 1

The resin composition (A) obtained in Production Example 1 was dried in a vacuum dryer at 85° C. for 5 hours, then fed to a single-screw melt extruder set to a temperature of 200° C. having a hopper whose inside had been replaced by nitrogen, and molten. The melt was extruded, and introduced to a cooling bath set to a temperature of 40° C. while drawing it by a first roller to obtain a filament 1 having a diameter of 1.8 mm. The filament 1 had a void fraction of 0.3%.

A resin formed article 1 shown in FIG. 1 was obtained using the resulting filament 1 by a 3D printer having a nozzle set to a temperature of 210° C.

In FIG. 1, dashed lines represented by 100a, 100b, 110a, 110b, etc. are virtual lines for explaining the structure of the resin formed article 1. A shape represented by these dashed lines is a cube, and lengths of 100a, 100b, 110a and 110b are 50 mm respectively. Each of 3a1, 3a2, 3a3, 3a4, 3b1, 3b2, 3b3 and 3b4 has a cylindrical shape with a diameter of 5 mm, and an angle θa and an angle θb are 45° respectively.

Various tests were conducted for the obtained resin formed article 1. The results are shown in Table 1.

Example 2

80 parts of the resin composition (A) obtained in Production Example 1 and 20 parts of hydrogenated styrene/butadiene/styrene block copolymer (SEBS: Tuftec H1051, manufactured by Asahi Kasei Chemicals Corporation) were mixed by a blender, and then this mixture was dried in a vacuum dryer at 85° C. for 5 hours.

A filament 2 was obtained in the same manner as in Example 1 except that this mixture was used instead of the dried resin composition (A) in Example 1. The filament 2 had a void fraction of 0.2%.

A resin formed article 2 was obtained using the resulting filament 2 in the same manner as in Example 1, and subjected to various tests. The results are shown in Table 1.

Comparative Example 1

A filament 3 was obtained in the same manner as in Example 1 except that the resin composition (A) was not dried in Example 1. The filament 3 had a void fraction of 12%.

A resin formed article 3 was obtained using the resulting filament 3 in the same manner as in Example 1, and subjected to various tests. The results are shown in Table 1.

Comparative Example 2

A filament 4 was obtained in the same manner as in Example 1 except that a polylactic acid resin (Ecodear V911X51, manufactured by Toray Industries, Inc.) was used instead of the resin composition (A) in Example 1. The filament 4 had a void fraction of 0.1%.

A resin formed article 4 was obtained using the resulting filament 4 in the same manner as in Example 1, and subjected to various tests. The results are shown in Table 1.

Comparative Example 3

100 parts of the polylactic acid resin used in Comparative Example 2 and 150 parts of an acrylic elastomer (METABLEN S-2001, manufactured by Mitsubishi Rayon Co., Ltd.) were mixed by a blender, and then this mixture was dried in a vacuum dryer at 80° C. for 5 hours.

A filament 5 was obtained in the same manner as in Example 1 except that this mixture was used instead of the dried resin composition (A) in Example 1. The filament 5 had a void fraction of 0.1%.

A resin formed article 5 was obtained using the resulting filament 5 in the same manner as in Example 1, and subjected to various tests. The results are shown in Table 1.

Comparative Example 4

A filament 6 was obtained in the same manner as in Example 1 except that an ABS resin (Denka ABSQF, manufactured by Denka Company Limited) was used instead of the resin composition (A) in Example 1. The filament 6 had a void fraction of 0.1%.

A resin formed article 6 was obtained using the resulting filament 6 in the same manner as in Example 1, and subjected to various tests. The results are shown in Table 1.

TABLE 1

| | | Examples | | Comparative Examples | | | |
|---|---|---|---|---|---|---|---|
| | | 1 | 2 | 1 | 2 | 3 | 4 |
| Resin components (parts) | Hydrogenated norbornene ring-opening polymer | 100 | 100 | 100 | — | — | — |
| | Polylactic acid resin | — | — | — | 100 | 100 | — |
| | ABS | — | — | — | — | — | 100 |

TABLE 1-continued

|  | Examples | | Comparative Examples | | | |
| --- | --- | --- | --- | --- | --- | --- |
|  | 1 | 2 | 1 | 2 | 3 | 4 |
| SEBS | — | 20 | — | — | — | — |
| Acrylic elastomer | — | — | — | — | 150 | — |
| Dried? | Yes | Yes | No | Yes | Yes | Yes |
| Void fraction | 0.3 | 0.2 | 12 | 0.1 | 0.1 | 0.1 |
| Surface roughness (Ra) of resin formed article (μm) | 0.3 | 0.4 | 1.1 | 0.7 | 0.8 | 0.8 |
| Warp of resin formed article (mm) | 0 | 0 | 0 | 0 | 0 | 3.2 |
| Warp of resin formed article after environmental test (mm) | 0 | 0 | 0 | 3.0 | 3.5 | 3.6 |
| Impact resistance | Good | Good | Good | Bad | Good | Good |

The followings can be seen from Table 1.

In the resin formed articles of Examples 1 and 2 formed using a three-dimensional modeling material containing an alicyclic structure-containing polymer and having a void fraction of 10 vol % or lower, the surface roughness value is low, no warp is observed, and also impact resistance is excellent.

On the other hand, in Comparative Example 2 using the polylactic acid resin, the resin formed article shows warp after the environmental test and is poor in impact resistance.

The problem of impact resistance in the polylactic acid resin can be improved by adding the elastomer component as described in Comparative Example 3, but in this case, the warp of the resin formed article is increased after the environmental test.

Furthermore, the resin formed article using the ABS resin in Comparative Example 4 has large warp.

Although these problems of warp and impact resistance can be improved by using an alicyclic structure-containing polymer as described in Comparative Example 1, a high void fraction increases the surface roughness value of the resin formed article in the case of the three-dimensional modeling material containing the alicyclic structure-containing polymer.

The invention claimed is:

1. A three-dimensional modeling material containing an alicyclic structure-containing polymer and having a void fraction of 10 vol % or lower,
    wherein the three-dimensional modeling material has a filament shape.

2. A method for producing the three-dimensional modeling material according to claim 1, including a step of drying a production raw material containing the alicyclic structure-containing polymer at a temperature of (a glass transition temperature of the alicyclic structure-containing polymer—30° C.) to (a glass transition temperature of the alicyclic structure-containing polymer—1° C.).

3. A resin formed article obtained by a thermal melting lamination method using the three-dimensional modeling material according to claim 1.

4. The three-dimensional modeling material according to claim 1, wherein the three-dimensional molding material has a diameter of 1.0 mm to 2.5 mm.

* * * * *